(12) United States Patent
Kim et al.

(10) Patent No.: US 7,728,465 B2
(45) Date of Patent: Jun. 1, 2010

(54) HYBRID STEPPING MOTOR HAVING HIGH TORQUE DENSITY

(75) Inventors: Seung Jong Kim, Seoul (KR); Jong Min Lee, Seoul (KR); Woo Yeon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 242 days.

(21) Appl. No.: 11/967,438

(22) Filed: Dec. 31, 2007

(65) Prior Publication Data

US 2009/0108711 A1    Apr. 30, 2009

(30) Foreign Application Priority Data

Oct. 24, 2007   (KR)   ............... 10-2007-0106960

(51) Int. Cl.
*H02K 37/14*   (2006.01)
*H02K 1/00*    (2006.01)

(52) U.S. Cl. ..................... 310/49.37; 310/216.023; 310/216.024; 310/216.038; 310/216.039

(58) Field of Classification Search ............. 310/49.34, 310/49.39, 49.43, 49.47, 216.023–216.029, 310/216.031, 216.033–216.039, 267, 268; *H02K 37/12, H02K 37/14*
See application file for complete search history.

(56) References Cited

U.S. PATENT DOCUMENTS 2,824,272 A  *  2/1958  Delaporte ................. 318/734
3,502,914 A  *  3/1970  Cox ..................... 310/216.017
5,168,187 A  * 12/1992  Baer et al. ................ 310/49.12
5,736,806 A  *  4/1998  Taghezout ........... 310/216.039
5,801,473 A  *  9/1998  Helwig ................. 310/216.061
5,854,526 A  * 12/1998  Sakamoto ............ 310/216.066

(Continued)

FOREIGN PATENT DOCUMENTS

JP          11-289737          10/1999

(Continued)

OTHER PUBLICATIONS

Korean Intellectual Property Office, Notice of Allowance, Nov. 30, 2009.

*Primary Examiner*—Tran N Nguyen
(74) *Attorney, Agent, or Firm*—Jones Day (57) ABSTRACT

There is provided a hybrid stepping motor comprising the following: a first rotor yoke and a second rotor yoke, each of the rotor yokes having a plurality of rotor teeth on a periphery thereof; a rotating shaft located between the first and second rotor yokes and supporting the first and second rotor yokes on a same axis, the rotating shaft including at least one permanent magnet magnetized in a direction of the axis; and a plurality of stator yokes, each of the stator yokes having a core portion, a coil wound around the core portion, and a plurality of stator teeth extending parallel to the axis from opposed end portions of the core portion, the stator yokes being disposed at regular intervals around the rotating shaft so that a constant air gap is maintained between radially inward surfaces of the stator teeth and radial end surfaces of the rotor teeth. A positive current is applied to the opposed and paired coils of said coils and a negative current is applied to the rest coils of said coils. The positive current and the negative current are applied at the same time and magnitude.

6 Claims, 9 Drawing Sheets

U.S. PATENT DOCUMENTS

| | | | | |
|---|---|---|---|---|
| 5,982,058 A | * | 11/1999 | Bustamante et al. | 310/49.12 |
| 6,081,053 A | * | 6/2000 | Maegawa et al. | 310/49.39 |
| 6,198,182 B1 | * | 3/2001 | Bustamante et al. | 310/49.47 |
| 6,979,918 B2 | * | 12/2005 | Aoshima et al. | 310/49.04 |
| 2002/0135242 A1 | | 9/2002 | Kawai | |

FOREIGN PATENT DOCUMENTS

| | | |
|---|---|---|
| JP | 2001-346372 | 12/2001 |
| KR | 1998-046512 | 9/1998 |
| KR | 2002-0039660 | 5/2002 |

* cited by examiner

HYBRID STEPPING MOTOR HAVING HIGH TORQUE DENSITY

The present application claims priority from Korean Patent Application No. 10-2007-0106960 filed on Oct. 24, 2007, the entire subject matter of which is incorporated herein by reference.

BACKGROUND

1. Field

The present invention relates to a hybrid stepping motor with improved core shaped and winding structure.

2. Background

In recent years, various hybrid stepping motors with built-in permanent magnets have been researched and developed. Compared to general stepping motors, such hybrid stepping motors are advantageous in that they consume nearly half of electric power to generate the same torque as that of a general stepping motor.

Figure 1:
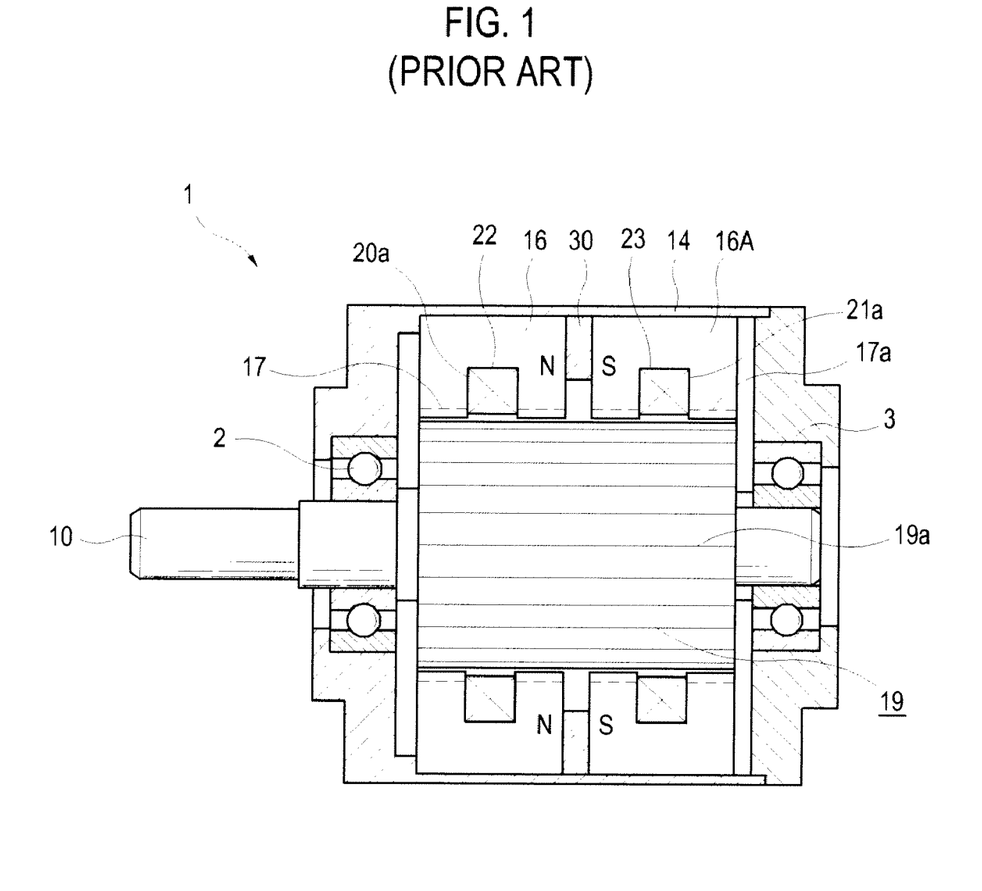
FIG. 1 is a sectional view of a prior art hybrid stepping motor.

FIG. 1 shows a hybrid stepping motor disclosed in Korean Patent Application Publication No. 1998-046512 as one example of known hybrid stepping motors. Referring to FIG. 1, in the prior art hybrid stepping motor 1, a rotating shaft 10 is rotatably supported on a pair of bearings 2, 3 disposed in both end portions of a stator casing 14. Ring-shaped first and second stator yokes 16, 16A with a ring-shaped magnet plate 30 mounted therebetween are disposed axially in the stator casing 14. Primary and secondary coil winding portions 20a, 21a are formed on an inner periphery of the first and second stator yokes 16, 16A, respectively. Primary and secondary coils 22, 23 are wound in the coil winding portions 20a, 21a, respectively. Thus, two cores are formed in the first stator yoke 16 while the other two cores are formed in the second stator yoke 16A. Surfaces of each core are provided with a plurality of stator teeth 17, 17a. The stator teeth 17, 17a, which are provided on the surfaces of the four cores of the first and second stator yokes 16, 16A, are deviated by a ¼ tooth for one another and with 90° phase difference. A rotor yoke 19 is disposed on the rotating shaft 10 to correspond to the stator yokes 16, 16A. An outer periphery of the rotor yoke 19 is provided with a plurality of rotor teeth 19a.

In the above-described prior art hybrid stepping motor 1, rotation of the rotor yoke 19 continues while magnetic flux is sequentially focused on the four cores in a manner that one magnetic flux generated by a current alternately applied to the primary and secondary coils 22 and 23 and the other magnetic flux generated by the ring-shaped magnet 30 are overlapped or offset to each other.

However, in the above-discussed prior art hybrid stepping motor 1, only one of the four cores of the stator yokes 16, 16A contributes to torque generation. Specifically, when a current is applied to the primary coil 22, no current is applied to the secondary coil 23. In such a case, bias flux, which is caused by the ring-shaped magnet plate 30, is allowed to flow through air gaps existing at the second stator yoke 16A side, to which a current is not applied. Such bias flux flows particularly through the teeth, which is less deviated from the stator teeth 19a of the second rotor yoke 19, of two cores of the second stator yoke 16A. Accordingly, there is a problem with the prior art hybrid stepping motor 1 in that torque is produced in an opposite direction to a rotational direction of the rotor yoke 19, thereby deteriorating efficiency of the hybrid stepping motor 1. In addition, since the coil winding portions 20a, 21a and the coils 22, 23 of the stator yokes 16, 16A are located outwardly of the rotor yoke 19, there is a further problem in that increasing a diameter of the rotor yoke 19 is restricted due to a determined diameter of the hybrid stepping motor 1.

BRIEF DESCRIPTION OF THE DRAWINGS

Embodiments according to the present invention may be described in detail with reference to the following drawings.

DETAILED DESCRIPTION OF THE PRESENT INVENTION

It is an object of the present invention to provide a hybrid stepping motor which produces a high torque and has a high torque density.

It is another object of the present invention to provide a hybrid stepping motor, which is configured such that a bias flux caused by a permanent magnet and a magnetic flux caused by cores and coils increase or decrease according to their directions at air gaps, thereby being configured to focus magnetic fluxes on a desired core.

It is yet another object of the present invention to provide a hybrid stepping motor, which is simply configured and being capable of enlarging a diameter of a rotor over a diameter of the motor to enhance spatial efficiency.

A hybrid stepping motor of the present invention comprises the following: first rotor yoke and a second rotor yoke, each of the rotor yokes having a plurality of rotor teeth on a periphery thereof; a rotating shaft located between the first and second rotor yokes and supporting the first and second rotor yokes on a same axis, the rotating shaft including at least one permanent magnet magnetized in a direction of the axis; and a plurality of stator yokes, each of the stator yokes having a core portion, a coil wound around the core portion and a plurality of stator teeth extending parallel to the axis from opposed end portions of the core portion, the stator yokes being disposed at regular intervals around the rotating shaft so that a constant air gap is maintained between radially inward surfaces of the stator teeth and radial end surfaces of the rotor teeth. A positive current is applied to the opposed and paired coils of said coils and a negative current is applied to the rest coils of said coils. The positive current and the negative current are applied at the same time and magnitude.

The core portions may be oriented parallel to the axis and may be located radially inward of the end surfaces of the stator teeth between the first rotor yoke and the second rotor yoke.

Further, the core portions may be oriented perpendicularly to the rotating shaft and may be located between the first rotor yoke and the second rotor yoke.

One end portion of the rotating shaft may comprise a first permanent magnet magnetized in the direction of the axis. Further, the other end portion of the rotating shaft may comprise a second permanent magnet magnetized in the direction of the axis. The first permanent magnet and the second permanent magnet may be disposed such that same poles are opposed to each other.

Further, the present invention may provide a hybrid stepping motor comprising the following: a first rotor yoke and a second rotor yoke, each of the rotor yokes having a plurality of rotor teeth on a periphery thereof; a rotating shaft located between the first and second rotor yokes and supporting the first and second rotor yokes on a same axis; a plurality of stator yokes, each of the stator yokes having a core portion oriented perpendicularly to the axis, a coil wound around the core portion and a plurality of stator teeth extending parallel to the axis from opposed end portions of the core portion, the stator yokes being disposed at regular intervals around the rotating shaft so that a constant air gap is maintained between radially inward surfaces of the stator teeth and radial end surfaces of the rotor teeth; and at least one ring-shaped permanent magnet attached throughout radial terminal end portions of the core portions, wherein the rotating shaft passes through the ring-shaped permanent magnet. A positive current is applied to the opposed and paired coils of said coils and a negative current is applied to the rest coils of said coils. The positive current and the negative current are applied at the same time and magnitude.

The hybrid stepping motor may comprise ring-shaped first and second permanent magnets magnetized in a direction of the axis. The first permanent magnet and the second permanent magnet may be disposed such that same poles are opposed to each other.

Four or six stator yokes may be provided in the above-described hybrid stepping motors.

A hybrid stepping motor of the present invention will now be described with reference to the accompanying drawings.

Figure 2:
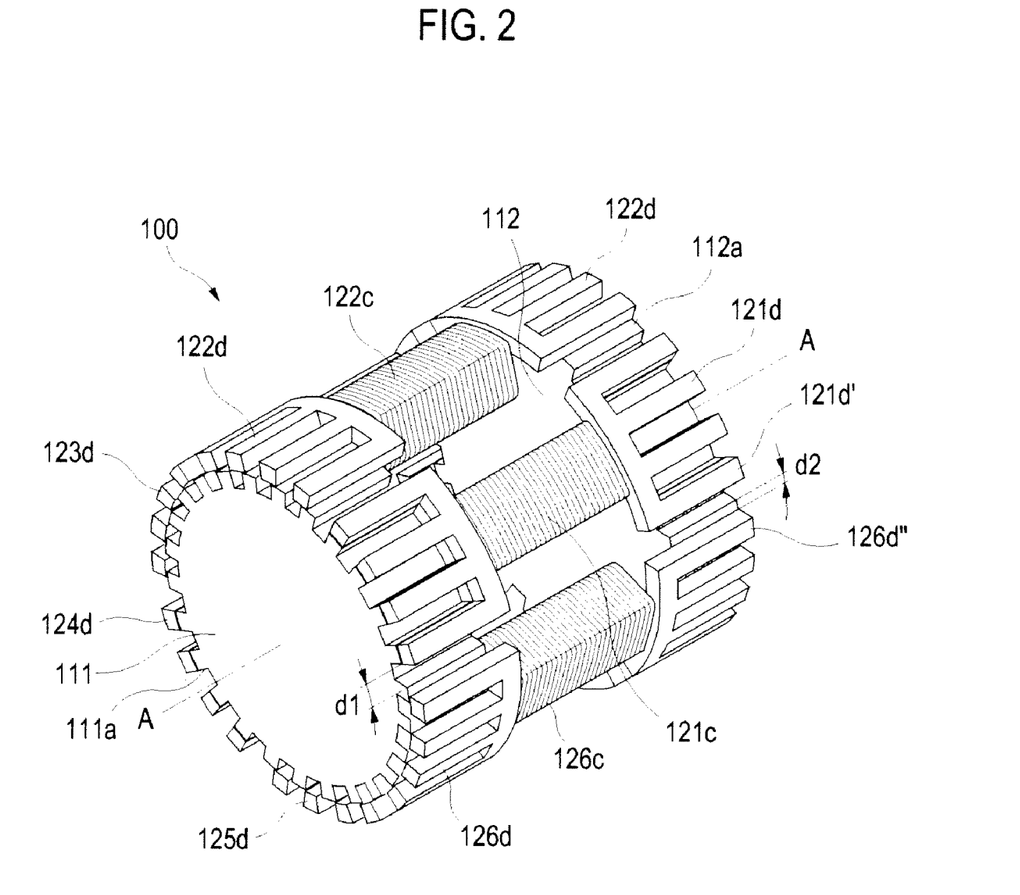
FIG. 2 is a perspective view of a hybrid stepping motor according to a first embodiment of the present invention.
Figure 3:
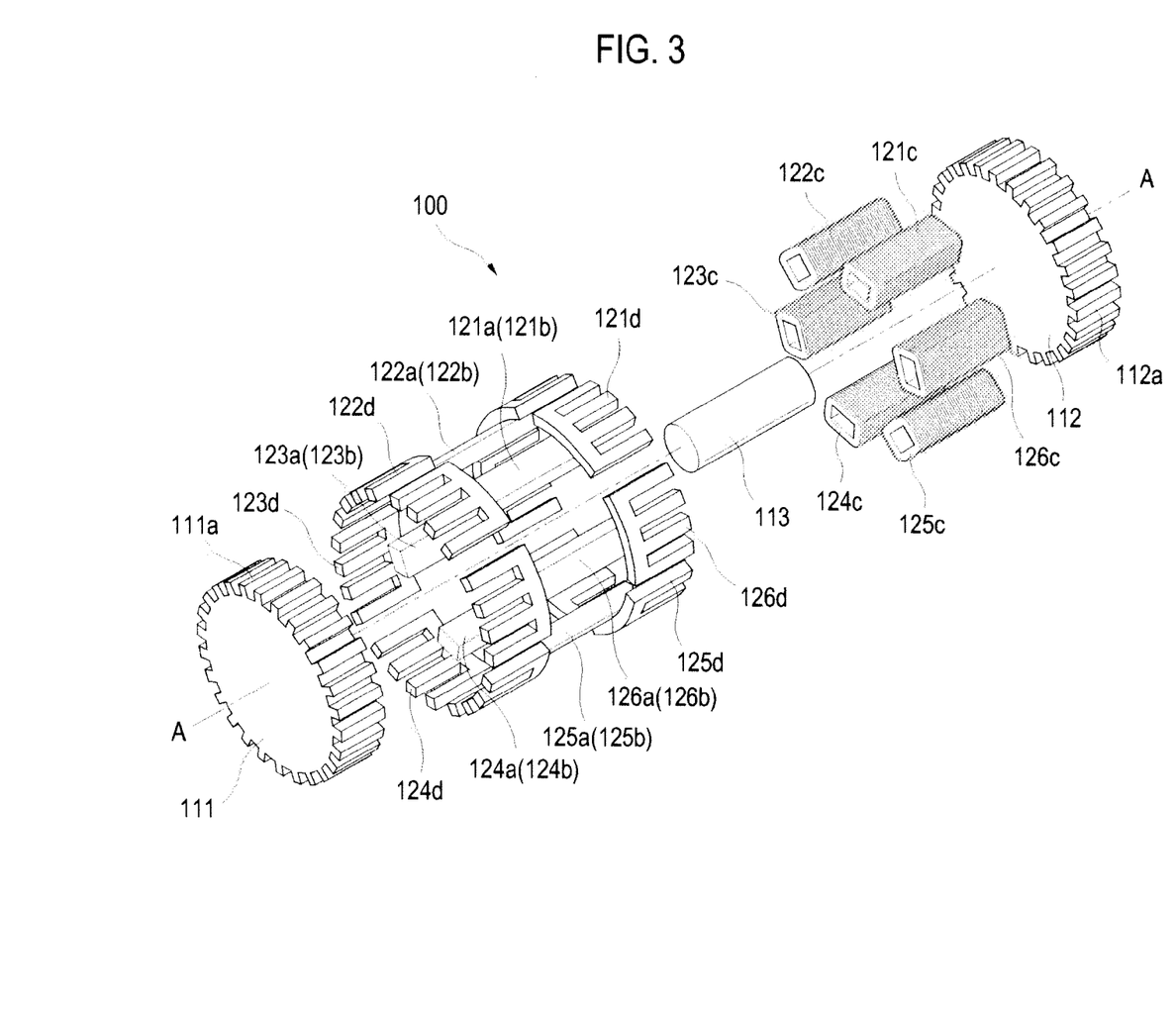
FIG. 3 is an exploded perspective view of the hybrid stepping motor shown in FIG. 2.

FIG. 2 is a perspective view of a hybrid stepping motor according to a first embodiment of the present invention. FIG. 3 is its exploded perspective view and FIG. 4 is its longitudinal sectional view.

Figure 4:
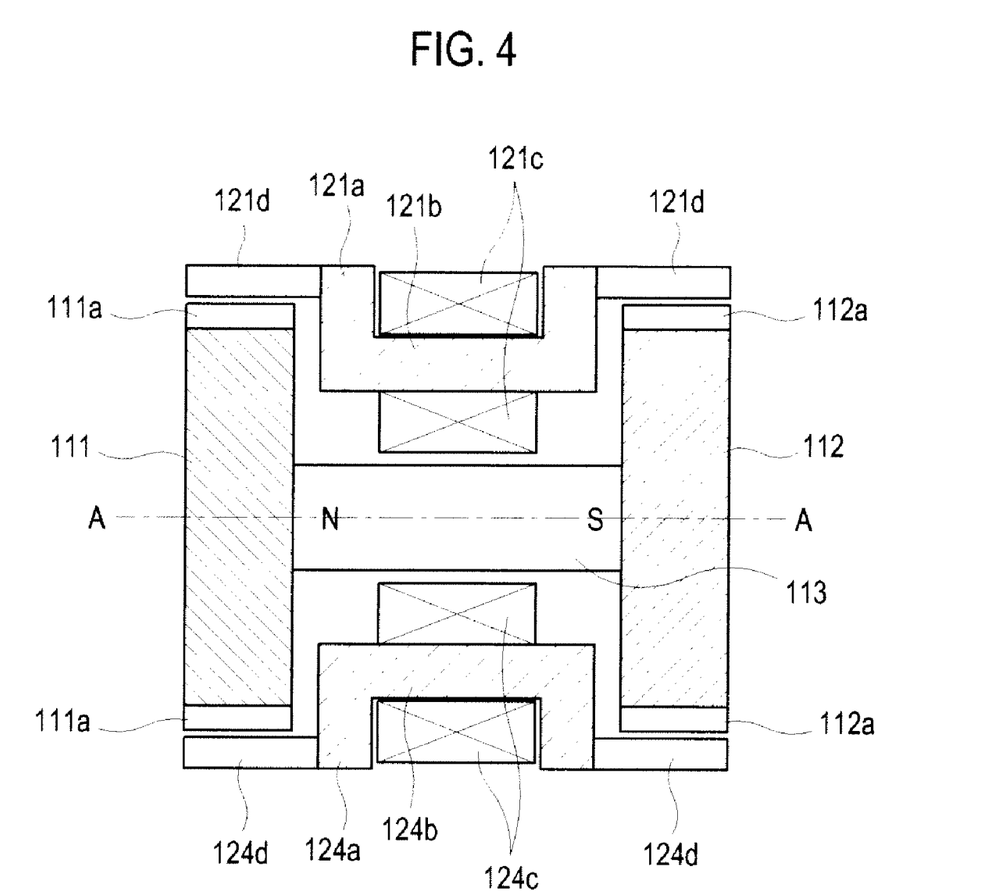
FIG. 4 is a longitudinal sectional view of the hybrid stepping motor shown in FIG. 2.

Referring to FIGS. 2 to 4, the hybrid stepping motor 100 constructed in accordance with the present invention comprises a rotor section and a stator section. The rotor section comprises: first and second rotor yokes 111, 112, which are components to be rotated by magnetic force; and a rotating shaft 113 supporting the first and second rotator yokes 111, 112 on a same axis A. The stator section comprises first to sixth stator yokes 121 to 126, which are disposed at regular intervals around the rotating shaft 113 and are separated from one another. Each of the stator yokes interacts with the rotor yokes 111 and 112.

The first and second rotor yokes 111 and 112 have the same shape. The first and second rotor yokes 111 and 112 are disposed on the same axis A. Each of the first and second rotor yokes 111, 112 has a plurality of rotor teeth 111a, 112a on its periphery.

The rotating shaft 113 is disposed on the axis A such that the axis passes through its center. Both end portions of the rotating shaft 113 are joined to a central portion of an inner surface of the first rotor yoke 111 and a central portion of an inner surface of the second rotor yoke 112, respectively. Thus, a combined structure of the first and second rotor yokes 111, 112 and the rotating shaft 113 takes the form of a bobbin. Thus, the first and second rotor yokes 111, 112 and the rotating shaft 113 are rotated together.

The rotating shaft 113 comprises at least one permanent magnet magnetized in a direction of the axis A (see FIG. 4). In this embodiment, the rotating shaft 113 itself is made from a permanent magnet. The rotating shaft 113 made from a permanent magnet may be circular rod-shaped or square rod-shaped.

The hybrid stepping motor 100 may be configured as follows: other rotating shafts (not shown) are provided at a central portion of an outer surface of the first rotor yoke 111 and a central portion of an outer surface of the second rotor yoke 112, respectively; those other rotating shafts are rotatably supported; and bearings (not shown) that are not affected by magnetic fluxes are provided. In such a case, rotation made by the combined structure of the first and second rotor yokes 111, 112 and the rotating shaft 113 can be transferred outward.

The stator yokes 121 to 126 are disposed radially to the axis and at regular intervals around the rotating shaft 113. All of the stator yokes 121 to 126 have the same shape. In this embodiment, each of the stator yokes has a longitudinal sectional shape, wherein its middle portion projects inward of the hybrid stepping motor 100 (shown in FIG. 4). The stator yokes 121 to 126 may be mounted to such a component as a casing or a housing (not shown) for forming an external appearance of the hybrid stepping motor 100. The stator yokes 121 to 126 have a length corresponding to a distance between the first rotor yoke 111 and the second rotor yoke 112.

Each of the stator yokes 121 to 126 includes: core portions 121a to 126 including coil winding portions 121b to 126b parallel to the axis A, respectively; coils 121c to 126c wound around the coil winding portions 121b to 126b, respectively; and a plurality of stator teeth 121d to 126d extending from opposed end portions of the core portion parallel to the axis A.

The stator yokes 121 to 126 are located in the hybrid stepping motor 100 such that radially inward surfaces of the respective stator teeth 121a to 126a and tooth surfaces of the rotor teeth 111a, 112a (i.e., radial end surfaces of the rotor teeth 111a, 112a) are opposed to each other with a constant air gap therebetween.

The coil winding portions 121b to 126b are formed in their respective core portions such that they are located radially inward of the tooth surfaces of the rotor teeth 111a, 112a between the first rotor yoke 11 and the second rotor yoke 112. Thus, the coils 121c to 126c are allowed to be wound around the coil winding portions 121b to 126b in a space radially inner than the rotor teeth 111a, 111b. Accordingly, a diameter of the hybrid stepping motor 100 can be determined so as to practically correspond to diameters of the rotor yokes 111, 112. Further, the diameters of the rotor yokes 111, 112 can be maximized compared to other hybrid stepping motors having the same diameter as that of the hybrid stepping motor of the present invention.

The hybrid stepping motor 100 according to this embodiment is configured such that among the core portions and the coils of the first to sixth stator yokes 121 to 126, two of them opposed to each other about the axis A constitute one phase. Since six core portions and coils are provided, the hybrid stepping motor 100 is allowed to be operated with 3-phase. The hybrid stepping motor 100 according to this embodiment will be described as follows: the core portion and the coil 121a, 121c and the core portion and the coil 124a, 124c of the first and fourth stator yokes 121, 124 constitute 'U-phase'; the core portion and the coil 122a, 122c and the core portion and the coil 125a, 125c of the second and fifth stator yokes 122, 125 constitute 'V-phase'; and the core portion and the coil 123a, 123c and the core portion and the coil 126a, 126c of the third and sixth stator yokes 123, 126 constitute 'W-phase'.

An interval between adjacent two stator yokes is determined such that a distance between the outermost stator tooth of one stator yoke and the outermost stator tooth opposed thereto of another adjacent stator yoke corresponds to a distance obtained by subtracting ⅓ tooth of the rotor tooth from 1 pitch of the rotor teeth (i.e., a distance obtained by adding ⅔ tooth of the rotor tooth and a clearance of the rotor teeth together). Referring to FIG. 2, the interval between the stator yokes is determined such that an interval between the outermost stator tooth 121d' of the first stator yoke 121 and the outermost stator tooth 126d" of the sixth stator yoke 126 corresponds to a distance obtained by adding a length d2 corresponding to the ⅔ tooth of one rotor tooth and a clearance d1 between the rotor tooth together.

Figure 5:
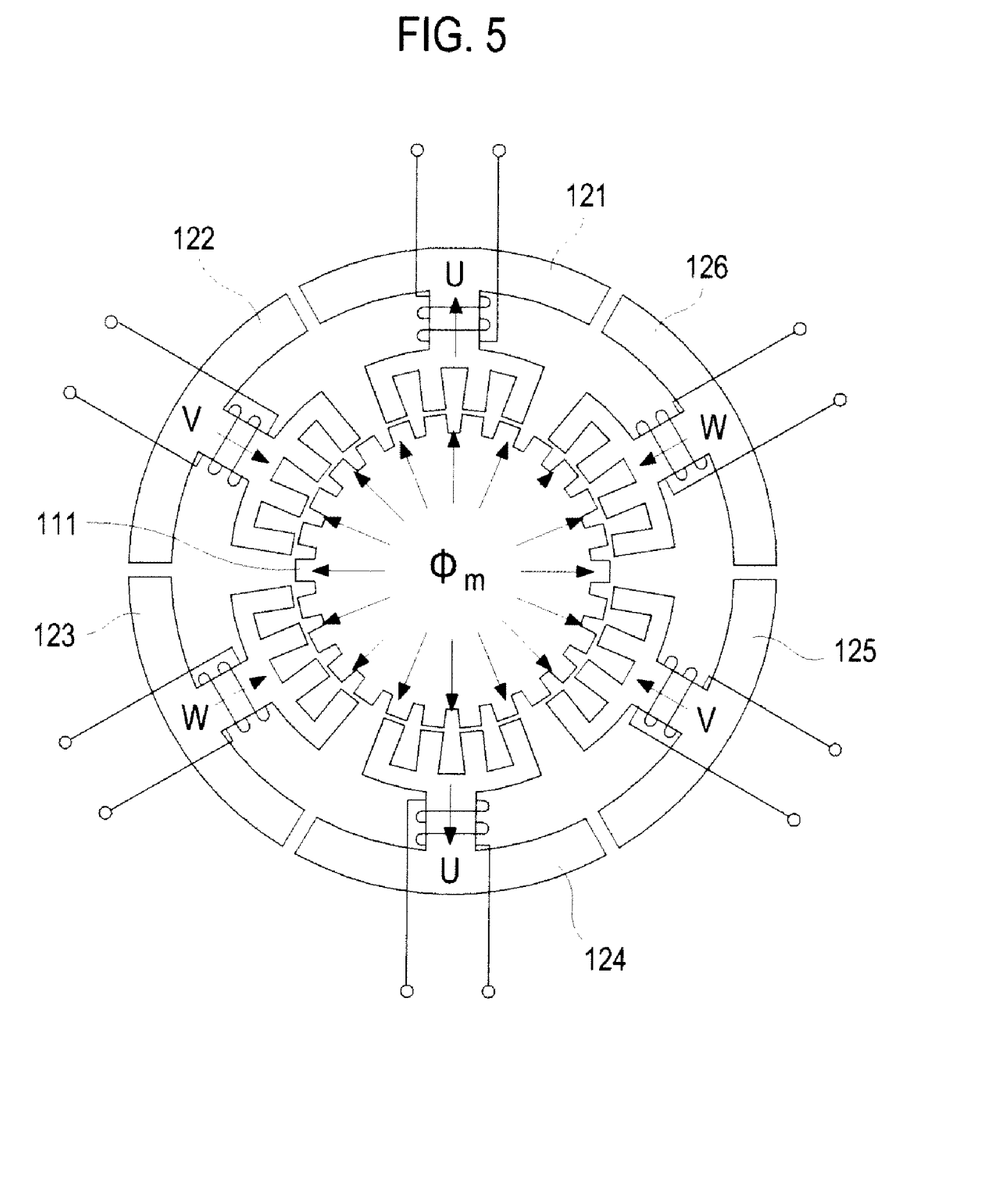
FIG. 5 is a schematic sectional view showing a wiring arrangement of the hybrid stepping motor.
Figure 6:
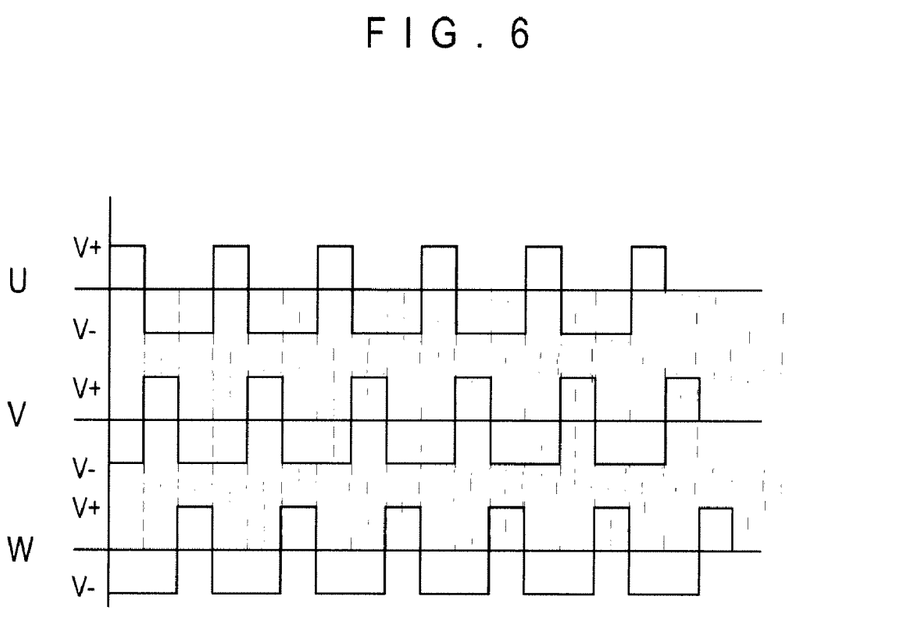
FIG. 6 is a waveform diagram of input voltages for operating the hybrid stepping motor.

FIG. 5 is a schematic sectional view, which is viewed from the first rotor yoke. FIG. 5 shows a wiring arrangement of the hybrid stepping motor. FIG. 6 is a waveform diagram of input voltages for operating the hybrid stepping motor 100. Rotation of the hybrid stepping motor 100 will now be described in view of FIGS. 4 to 6.

A bias flux, which is generated by the rotating shaft 113 comprising one permanent magnet, emanates from an N-pole of the rotating shaft 113 and radially spreads out at the first rotor yoke 111. It then flows through the core portions of each phase after passing across an air gap existing at the first rotor yoke 111 side. Subsequently, it passes across an air gap existing at the second rotor yoke 112 side and collects to a center of the second rotor yoke 112 and then enters an S-pole of the rotating shaft 113.

Voltages having waveforms shown in FIG. 6 are applied to each phase at each step. While one step progresses, a positive (+)/negative (−)/positive (+) current, a negative (−)/positive (+)/negative (−) current and a negative (−)/negative (−)/positive (+) current are applied at the same time and magnitude to the U-phase, V-phase and W-phase respectively. That is, as to the rotation of one step, a positive (+) current is applied to the one phase and a negative (−) current is applied to the remaining two phases. Accordingly, when the hybrid stepping motor 100 is operated, a positive (+) or negative (−) current is always applied to all of the coils 121c to 126c.

When a positive (+) current is applied to the U-phase and negative (−) currents are applied to the V-phase and W-phase at the same time and magnitude like the voltage waveforms shown in FIG. 6, a magnetic flux generated by the coils 121c, 124c of the U-phase flows from the first rotor yoke 111 toward the second rotor yoke 112 in the same direction as that of said bias flux. Further, after passing across the air gap existing at the second rotor yoke 112 side, it does not collect to the rotating shaft 113 (i.e., a center of the second rotor yoke 112) but returns to the first rotor yoke 111 via the core portions 122c, 125c of the V-phase or the core portions 123a, 126a of the W-phase. It then enters the core portions 121a, 124a of the U-phase. On the other hand, a magnetic flux generated by applying a current to the coils 122c, 125c of the V-phase or the coils 123c, 126c of the W-phase flows in an opposite direction to the direction of said bias flux and the magnetic flux caused by the U-phase. In other words, the magnetic flux caused by the V-phase or the W-phase flows from the second rotor yoke 112 toward the first rotor yoke 111 and passes across the air gap existing at the first rotor yoke 111 side. It then collects to the core portions 121a, 124a of the adjacent U-phase and returns to the second rotor yoke 112 and returns to the core portions 122a, 125a of the V-phase and the core portions 123a, 126a of the W-phase. In connection with the foregoing description, the direction of each of the above-described magnetic fluxes is shown as an arrow and the bias flux is shown as $\Phi_m$ in FIG. 5.

As such, the bias flux and the magnetic fluxes generated by all of the electromagnets (core portions and coils) flow in the same direction in the core portions of the U-phase. However, the direction of the bias flux is opposite to the directions of the magnetic fluxes caused by the electromagnets (core portions and coils) at the core portions of the V-phase or W-phase. Accordingly, in case a magnitude of the added up magnetic fluxes caused by the electromagnets (the core portions and the coils) and a magnitude of the bias flux are equal at the air gap between the rotor teeth of the rotor yoke and the stator teeth of the stator yoke pair of the V-phase or W-phase, the magnetic fluxes caused by the electromagnets and the bias flux are allowed to be added to and be subtracted from each other or offset, thereby not generating any electromagnetic force in the cores of the V-phase or W-phase. On the contrary, in case of the air gap between the rotor teeth of the rotor yoke and the stator teeth of the stator yoke of the U-phase, the bias flux and the magnetic fluxes caused by the current application are concentrated and the magnetic flux and the electromagnetic force are thus maximized. This generates the rotational torque according to relative position between the rotor teeth of the rotor yoke and the stator teeth of the stator yoke of the U-phase.

The hybrid stepping motor 100 maintains its rotation by applying currents to the coils 121c and 124c, 122c and 125c, 123c and 126c so that magnetic flux densities are sequentially maximized in the U-phase, V-phase and W-phase.

Further, since currents having the same magnitude are simultaneously applied to all of the phases and an excess current is not applied to the coils pertaining to one phase, the currents can be dispersed. Thus, problems such as heat generation can be prevented and the magnetic flux efficiency can be enhanced.

While the hybrid stepping motor 100 of this embodiment is operated with 3-phase by using six stator yokes and constituting one phase by the opposed coils of the stator yokes, the hybrid stepping motor of the present invention may be configured to be operated with 3-phase by using three stator yokes.

Figure 7:
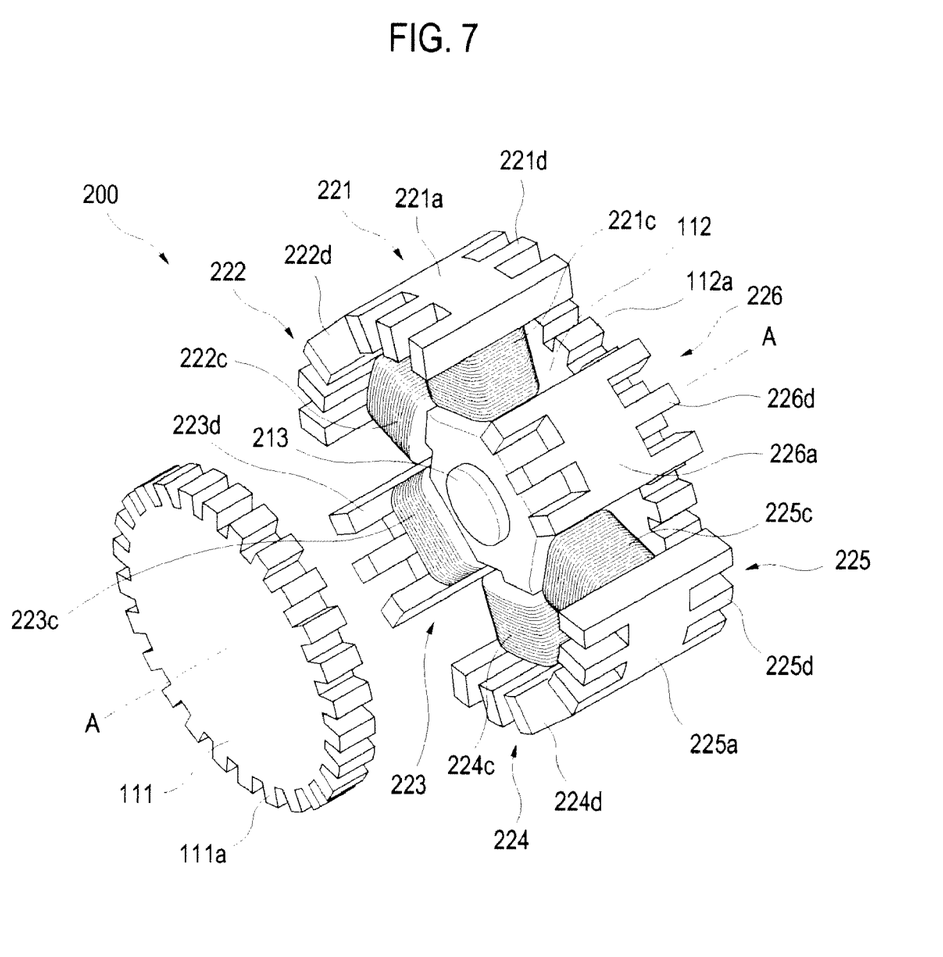
FIG. 7 is a partially exploded perspective view of a hybrid stepping motor according to a second embodiment of the present invention.
Figure 8:
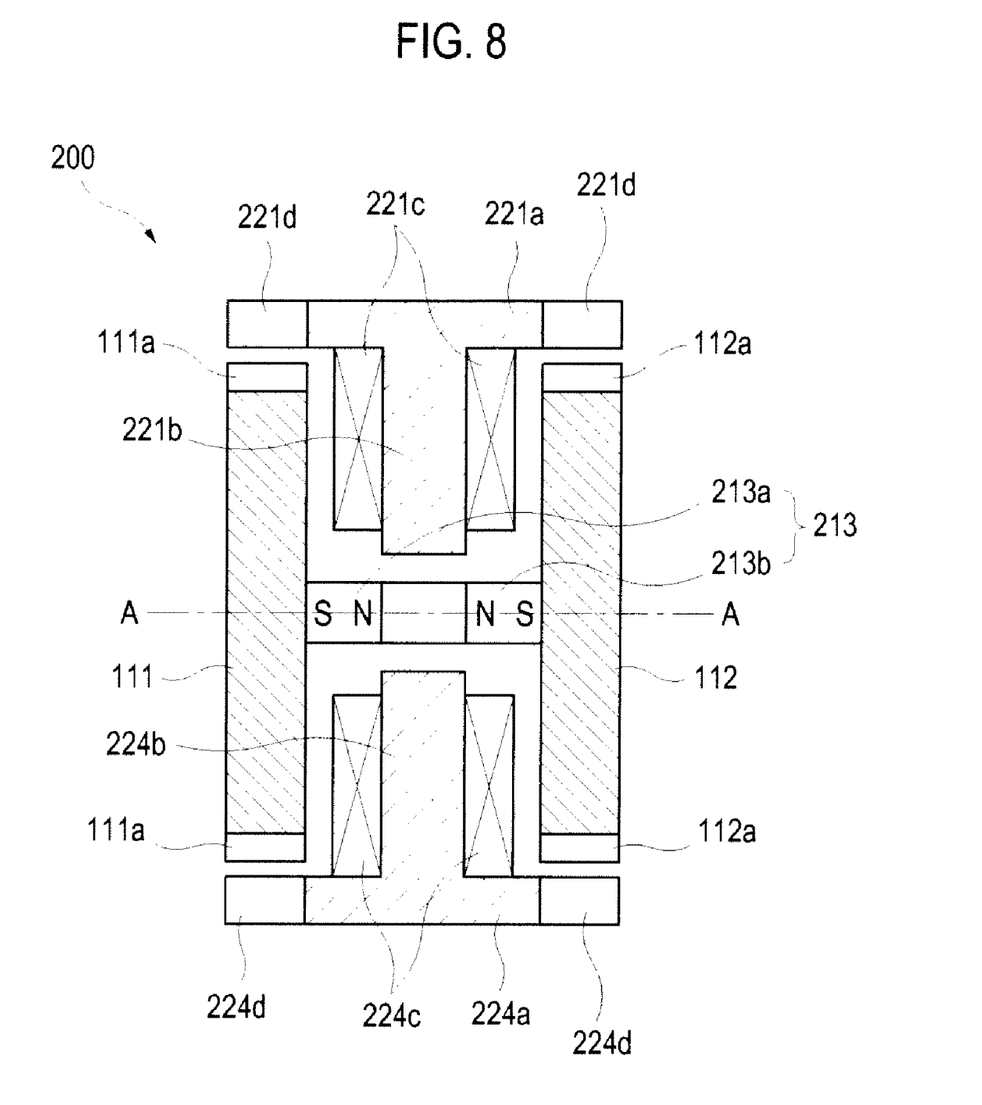
FIG. 8 is a longitudinal sectional view of the hybrid stepping motor shown in FIG. 7.

FIG. 7 is a partially exploded perspective view of a hybrid stepping motor according to a second embodiment of the present invention. FIG. 8 is its longitudinal sectional view.

The hybrid stepping motor 200 of this embodiment is similar to the hybrid stepping motor 100 of the first embodiment, except that: the rotating shaft coaxially connecting the rotor yokes includes two permanent magnets; the core portion of the stator yoke includes a coil winding portion perpendicular to the axis A; and the coil is wound such that its winding axis is perpendicular to the axis A. Like reference numerals refer to like elements in comparison with the hybrid stepping motor 100 of the first embodiment and descriptions relating thereto are omitted herein.

The rotating shaft 213 coaxially joins the first and second rotor yokes 111, 112. One end portion of the rotating shaft 213 is configured as a first permanent magnet 213a coaxially joined to the inner surface of the first rotor yoke 111. The other end portion of the rotating shaft 213 is configured as a second permanent magnet 213b coaxially joined to the inner surface of the second rotor yoke 112. As shown in FIG. 8, the first and second permanent magnets 213a, 213b are magnetized in the direction of the axis A and are arranged such that the same poles face each other.

A plurality of stator yokes 221 to 226 is disposed at regular intervals around the rotating shaft 213. In the hybrid stepping motor 200 of this embodiment, said plurality of stator yokes 221 to 226 are configured as first to sixth rotor yokes 221 to 226.

A core portion 221a to 226 of each rotor yoke includes at its middle portion a coil winding portion 221b to 226b perpendicular to the axis A (the coil winding portions of the coils of only the first and fourth stator yokes are shown in the figure). Thus, each core portion has a generally T-shaped longitudinal section. The coils 221c to 226c are wound on those coil winding portions about each axis of the coil winding portions. The coil is wound on the coil winding portion perpendicular to the axis A, thereby facilitating coil winding work. Opposed end portions of each core portion 221a to 226a are formed with stator teeth 221d to 226d extending parallel to the axis A.

Each stator yoke is disposed radially about the axis A so that radially inward surfaces of its stator teeth 221d to 226d are opposed to tooth surfaces of the rotor teeth 111a, 112a (i.e., radial end surfaces of the rotor teeth 111a, 112a) with a constant air gap therebetween.

N-poles of the first and second permanent magnet 213a, 213b are opposed to each other. Thus, the bias fluxes collect to a central portion of the hybrid stepping motor 200 from each permanent magnet, and pass through air gap between the rotating shaft 213 and six core portions and the stator yokes. They then symmetrically flow to both the first rotor yoke 111 and the second rotor yoke 112, and return to S-poles of each permanent magnet 213a, 213b once again (in case S-poles of the first and second permanent magnet 221, 222 are opposed to each other, the bias fluxes flow along an opposite path to the above-described path). As such, in the hybrid stepping motor 200 of this embodiment, same polarities appear on corresponding surfaces of the first and second rotor yokes 111, 112, unlike the hybrid stepping motor 100 of the first embodiment.

Among six stator yokes 221 to 226, the core portions and the coils of two stator yokes diametrically opposed to each other about the rotating shaft 213 constitute one phase, thereby accomplishing a 3-phase operation. The hybrid stepping motor according to this embodiment will be described as follows: the core portion 221a and the coil 221c and the core portion 224a and the coil 224c constitute 'U-phase'; the core portion 222a and the coil 222c and the core portion 225a and the coil 225c constitute 'V-phase'; and the core portion 223a and the coil 223c and the core portion 226a and the coil 226c constitute 'W-phase'.

The hybrid stepping motor 200 is operated by applying currents with voltage waveforms shown in FIG. 6 to the U-phase, V-phase and W-phase. For example, when a positive (+) current is applied to the U-phase, a magnetic flux caused by the coils 221c, 224c pertaining to the U-phase flows in the same direction as that of the bias flux and diverges laterally at the stator yoke 221, 224 to reach both the first rotor yoke 111 and the second rotor yoke 112. It then returns to the core portions of the U-phase after passing through the core portions of the adjacent V-phase or W-phase. On the contrary, since negative (−) currents are applied to the coils 222c, 225c of the V-phase and the coils 223c, 226c of the W-phase, magnetic fluxes caused by those phases first flow to a central portion of the rotating shaft 213 and pass through the core portions 221a, 224a of the adjacent U-phase. They then reach both the first rotor yoke 111 and the second rotor yoke 112 along the same path as the magnetic flux of the U-phase and pass across air gap between the rotor teeth and the stator teeth, and return to the core portions 222a, 225a pertaining to the V-phase and the core portions 223a, 226a pertaining to the W-phase. That is, the magnetic fluxes caused by the U-phase with positive (+) voltage applied and the U-phase or W-phase negative (−) voltage applied have the same magnetic flux paths. Further, the magnetic fluxes caused by those phases are added to or subtracted from each other in the air gap between the stator teeth and the rotor teeth. Thus, the magnetic flux densities become nearly zero in the air gap between the rotor teeth and the stator teeth of the stator yokes pertaining to the V-phase and W-phase. However, the magnetic fluxes are concentrated between the rotor teeth and the stator teeth of the stator yokes pertaining to the U-phase and the magnetic flux density thus becomes maximum, thereby generating rotational torque.

Figure 9:
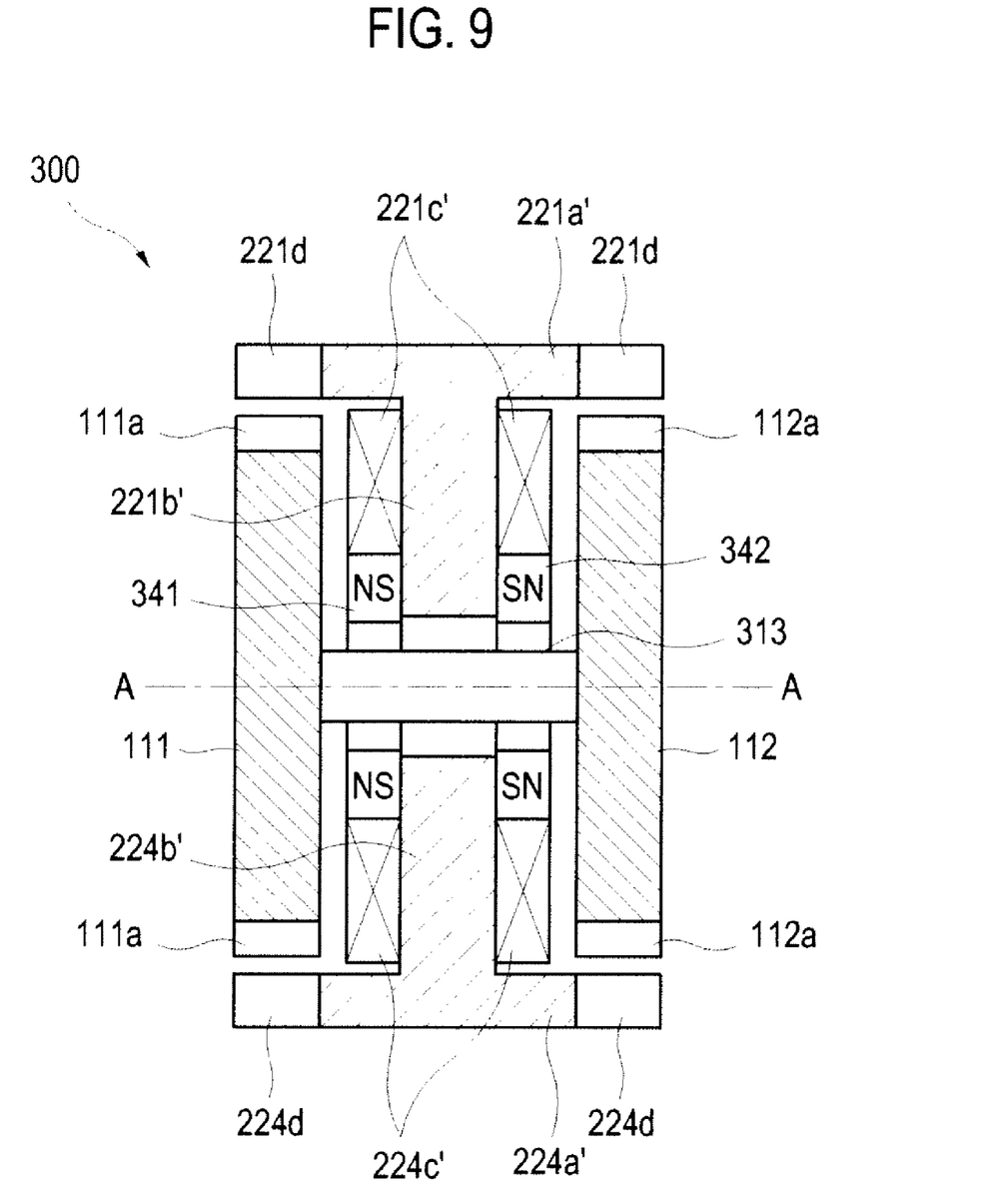
FIG. 9 is a longitudinal sectional view of a hybrid stepping motor according to a third embodiment of the present invention.

FIG. 9 is a longitudinal sectional view showing a hybrid stepping motor according to a third embodiment of the present invention.

The hybrid stepping motor 300 of this embodiment is similar to the hybrid stepping motor 100, 200 of the first and second embodiments, except that the rotating shaft is comprised of non-magnetic material and the permanent magnet is attached to the stator yokes. In FIG. 9, like reference numerals refer to like elements in comparison with the hybrid stepping motor 100, 200 of the first and second embodiments.

The rotating shaft 313, which coaxially connects the first and second rotor yokes 111, 112, is comprised of non-magnetic material.

Each core portion 221a' to 226a' includes a coil winding portion 221b' to 226b' perpendicular to the axis A. The coils 221c' to 226c' are wound on the coil winding portions 221a' to 226a' about each axis of the coil winding portion with a certain space left from its radial terminal end portion. Only the core portions 221a', 224a', the coil winding portions 221b', 224b' and the coils 221c', 224c' of the stator yoke and the fourth stator yoke are shown in FIG. 9.

First and second permanent magnets 341, 342, which generate bias fluxes, have a ring shape. The first and second permanent magnets 341, 342 are attached throughout the terminal end portions of all the coil winding portions 221b' to 226b' such that they are symmetrically located and their same poles face each other.

The bias flux of the first permanent magnet 341 passes across air gap in the direction of the axis A and radially spreads out while passing throughout the first rotor yoke 111. Subsequently, it passes across the air gap between the rotor teeth 111a of the first rotor yoke 111 and the stator teeth 221d to 226d of the first and sixth stator yokes 221 to 226 and passes through the core portions 221a to 226a of each stator yoke and then returns to the first permanent magnet 341. The bias flux of the second permanent magnet 342 has a path symmetrical to the bias flux path of the first permanent magnet 341.

Flow of the magnetic fluxes caused by applying currents to the U-phase, V-phase and W-phase is the same as that of the hybrid stepping motor 200 of the second embodiment.

The ring-shaped permanent magnets 341, 342 are used in the hybrid stepping motor 300 of this embodiment and large-sized permanent magnets can be used. Accordingly, torque of the hybrid stepping motor 300 can be increased. Further, since the permanent magnets 341, 342 are attached to the terminal end portions of the coil winding portions 221a' to 226a', it is easy to assemble the permanent magnets.

While the hybrid stepping motors of the above-described embodiments have been described to be operated with 3-phase, the hybrid stepping motor of the present invention may be configured to be operated with 2-phase. In such a case, two or four stator yokes will be arranged at regular intervals around the rotating shaft. Further, intervals between the stator yokes will be determined such that an interval between the stator teeth opposed to each other corresponds to a distance obtained by subtracting ½ tooth from one pitch of the rotor teeth.

According to the hybrid stepping motor of the present invention, since currents with the same magnitude are applied to all of the coils, magnetic flux density of the electromagnets, which the stator yokes constitute, can be raised and unused coils do not exist to thereby enhance efficiency. Further, since a positive or negative current is always applied to every coil, current disperses and heat generation is thus small and magnetic flux efficiency becomes high. Also, since a positive current is applied to one coil or one phase and a negative current is applied to the rest coils or the rest phases at the same time and magnitude, the bias flux caused by the permanent magnets and the magnetic fluxes caused by current application can be added to or subtracted from each other or can be offset. Accordingly, the magnetic flux density can be the maximum in one coil or one phase, whereas the magnetic flux density can be zero in the rest coils or the rest phases. Further, since the stator teeth of the opposed end portions of the stator yokes and two rotor yokes interact with each other to generate a drive torque, torque density (torque/motor volume) is high. Further, since the core portions, around which the coils are wound, are disposed at inner side than the rotor teeth between laterally located the rotor yokes, the diameter of the rotor yokes can be maximized without increasing the entire diameter of the motor.

The hybrid stepping motor of the present invention may be applied to an environment that needs a motor in a small space, e.g., a motor for robots, a small-scaled conveyance system, a domestic pump, an industrial refrigerator, an automatic vending machine, a monitoring camera, a water purifier, a microscope, etc. Further, it may be widely applied to a small-sized motor requiring comparatively high torque.

It should be understood that the above-described embodiments are merely part of various embodiments employing the principle of the present invention. It will be understood by those skilled in the art that various alternations or modifications can be made without departing from the scope of the present invention.

What is claimed is:

1. A hybrid stepping motor, comprising:
   a first rotor yoke and a second rotor yoke, each of the rotor yokes having a plurality of rotor teeth on a periphery thereof;
   a rotating shaft located between the first and second rotor yokes and supporting the first and second rotor yokes on a same axis, the rotating shaft including at least one permanent magnet magnetized in a direction of the axis; and
   a plurality of stator yokes, each of the stator yokes having a core portion, a coil wound around the core portion, and a plurality of stator teeth extending parallel to the axis from opposed end portions of the core portion, the stator yokes being disposed at regular intervals around the rotating shaft so that a constant air gap is maintained between radially inward surfaces of the stator teeth and radial end surfaces of the rotor teeth;
   wherein a positive current is applied to the opposed and paired coils of said coils and a negative current is applied to the rest coils of said coils, wherein the positive current and negative current are applied at the same time and magnitude.

2. The hybrid stepping motor of claim 1, wherein the core portions are oriented parallel to the axis and are located radially inward of the end surfaces of the stator teeth between the first rotor yoke and the second rotor yoke.

3. The hybrid stepping motor of claim 1, wherein the core portions are oriented perpendicularly to the rotating shaft and are located between the first rotor yoke and the second rotor yoke.

4. The hybrid stepping motor of claim 1, wherein one end portion of the rotating shaft comprises a first permanent magnet magnetized in the direction of the axis and the other end portion of the rotating shaft comprises a second permanent magnet magnetized in the direction of the axis, wherein the first permanent magnet and the second permanent magnet are disposed such that same poles are opposed to each other.

5. The hybrid stepping motor of any one of claims 1 to 4, wherein four stator yokes are provided.

6. The hybrid stepping motor of any one of claims 1 to 4, wherein six stator yokes are provided.

* * * * *